No. 709,499. Patented Sept. 23, 1902.
F. C. MORRISON.
CAN LABELING MACHINE.
(Application filed Sept. 25, 1895.)
(No Model.) 10 Sheets—Sheet 1.
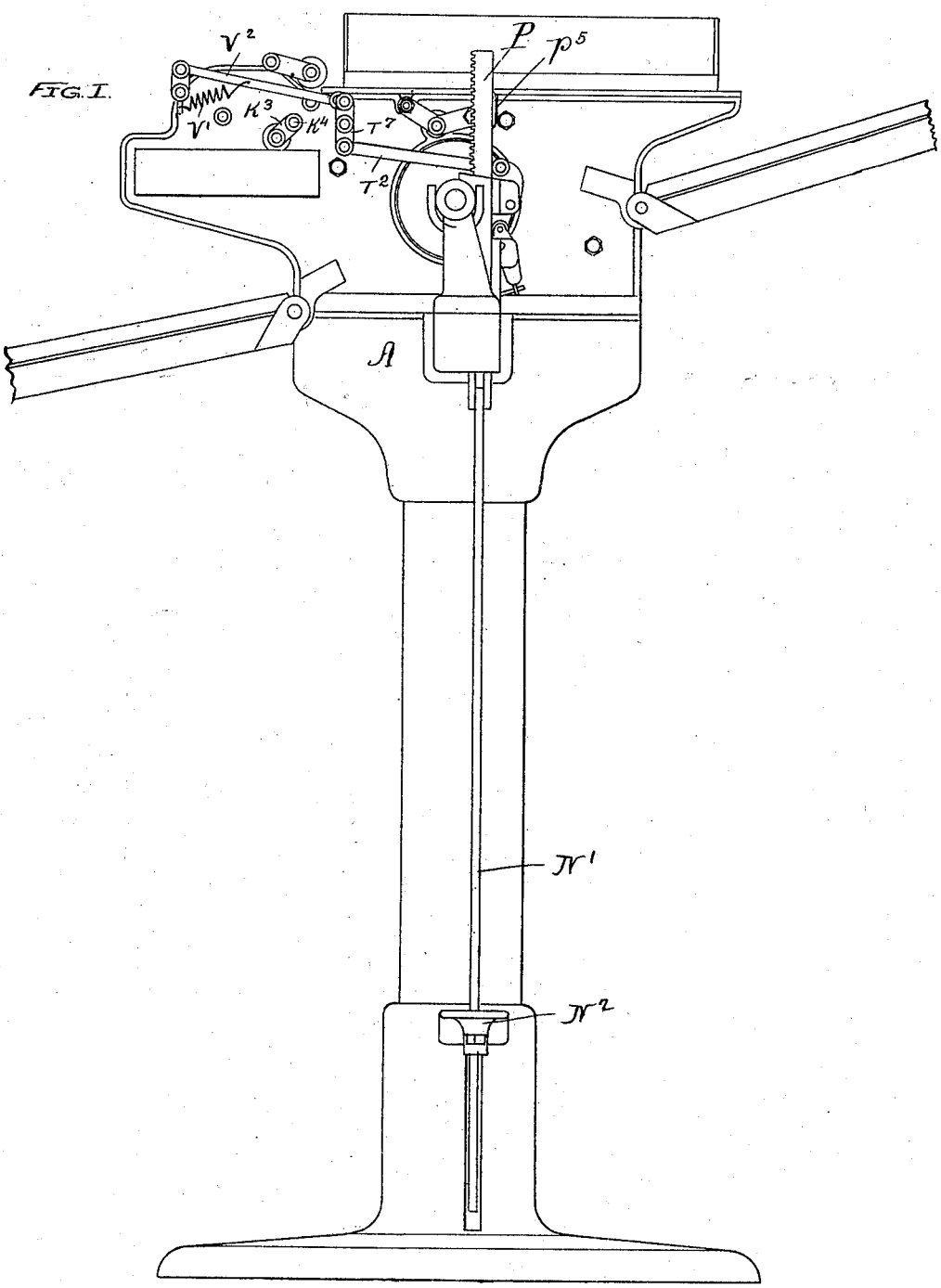

No. 709,499. Patented Sept. 23, 1902.
F. C. MORRISON.
CAN LABELING MACHINE.
(Application filed Sept. 25, 1895.)
(No Model.) 10 Sheets—Sheet 2.
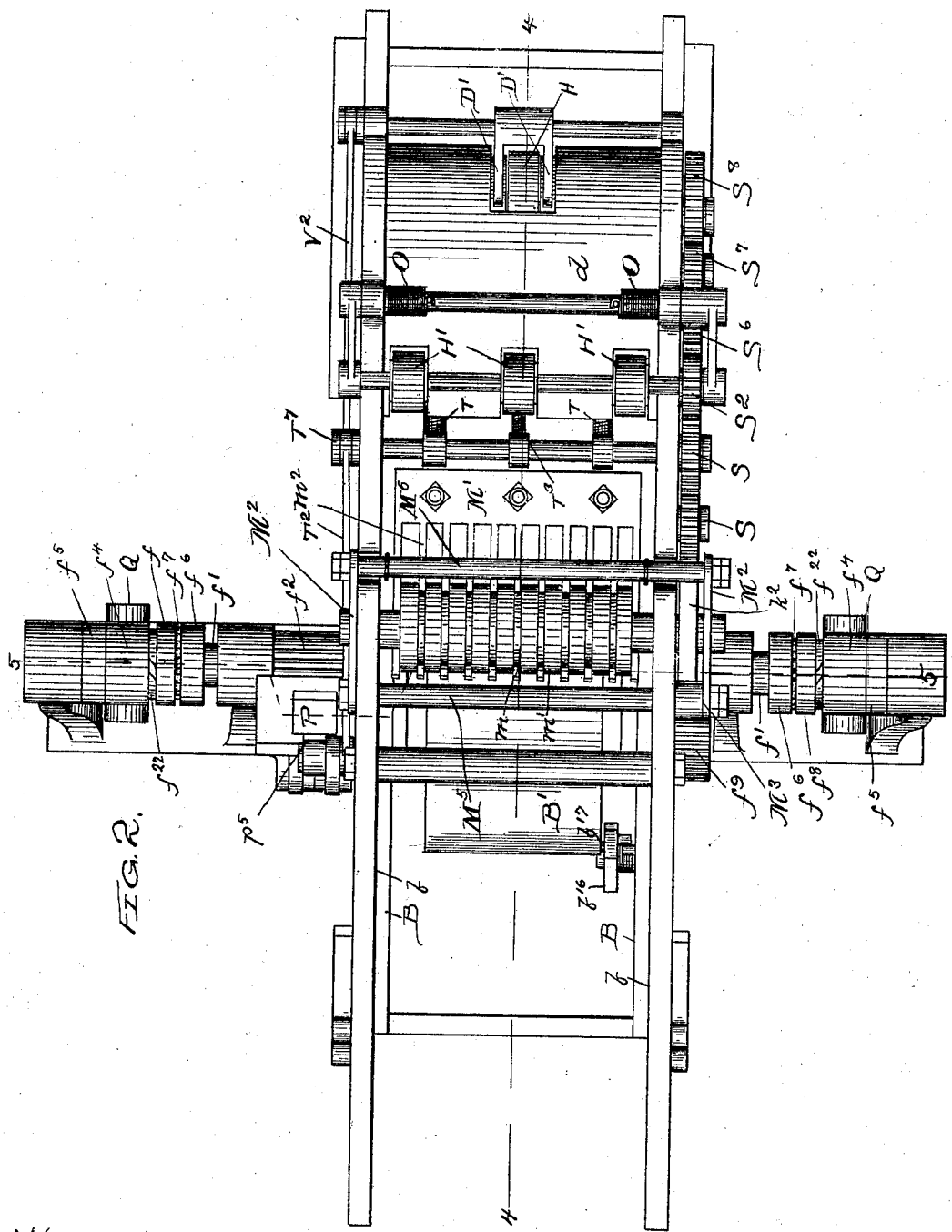

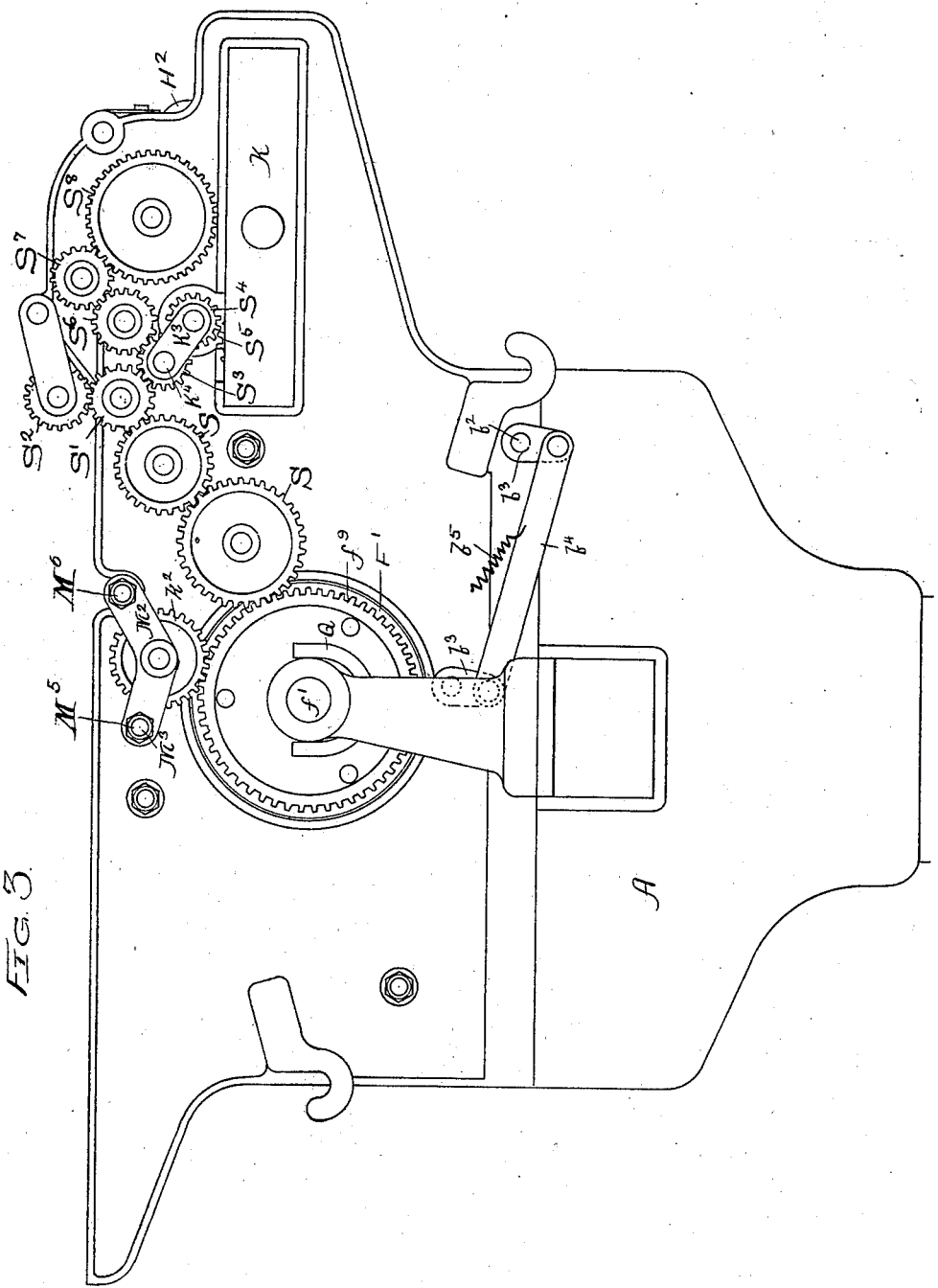

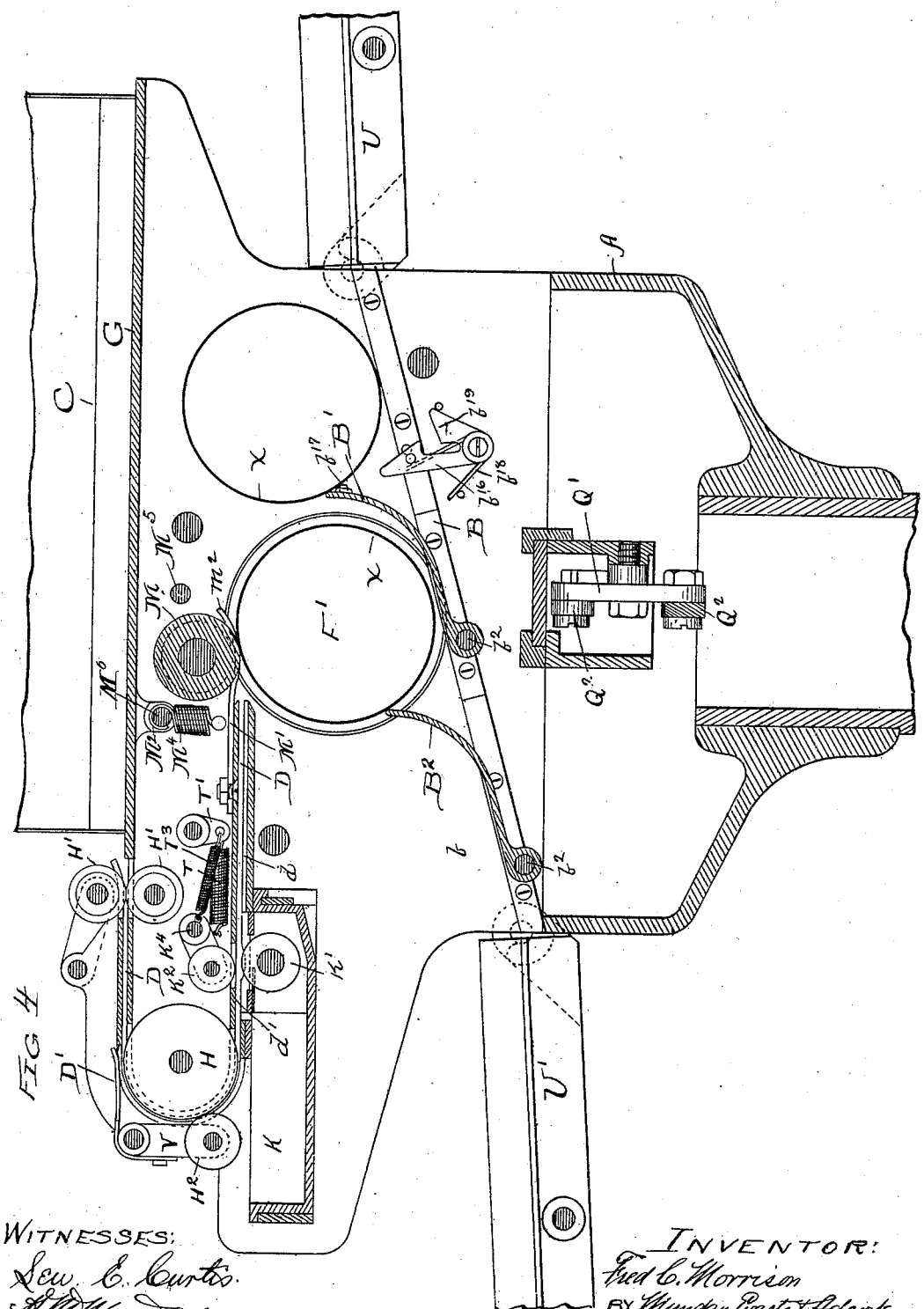

No. 709,499. Patented Sept. 23, 1902.
F. C. MORRISON.
CAN LABELING MACHINE.
(Application filed Sept. 25, 1895.)
(No Model.) 10 Sheets—Sheet 5.
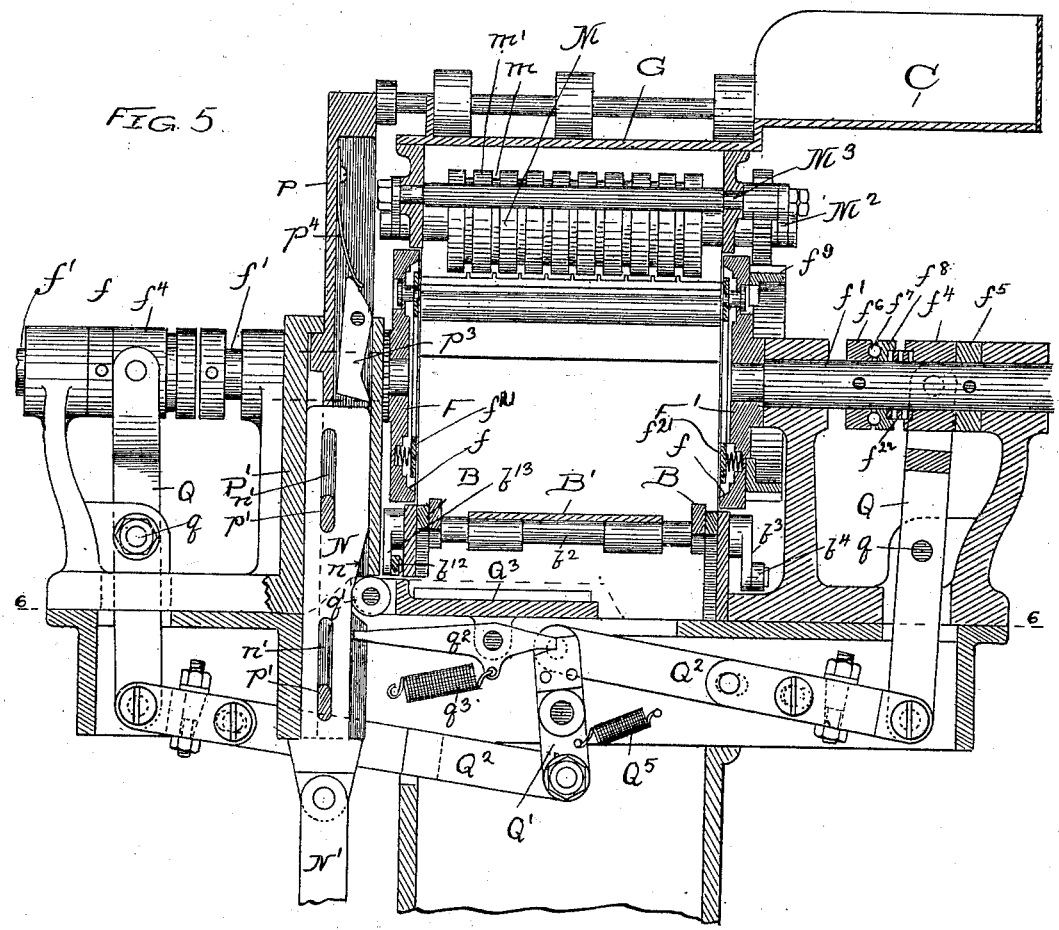
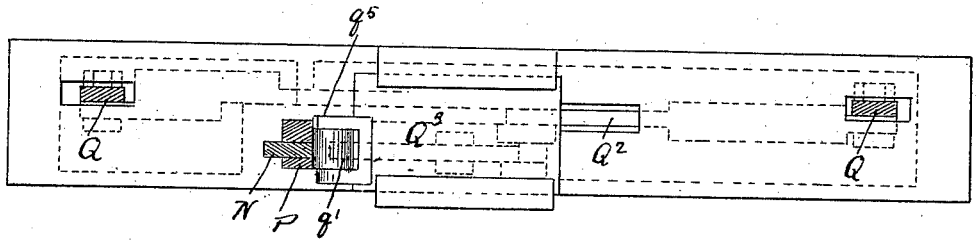
WITNESSES:
Sew. E. Curtis
H. W. Munday
INVENTOR:
Fred C. Morrison
BY Munday, Evarts & Adcock
HIS ATTORNEYS.
THE NORRIS PETERS CO., PHOTO-LITHO., WASHINGTON, D. C.

No. 709,499. Patented Sept. 23, 1902.
F. C. MORRISON.
CAN LABELING MACHINE.
(Application filed Sept. 25, 1895.)
(No Model.) 10 Sheets—Sheet 6.
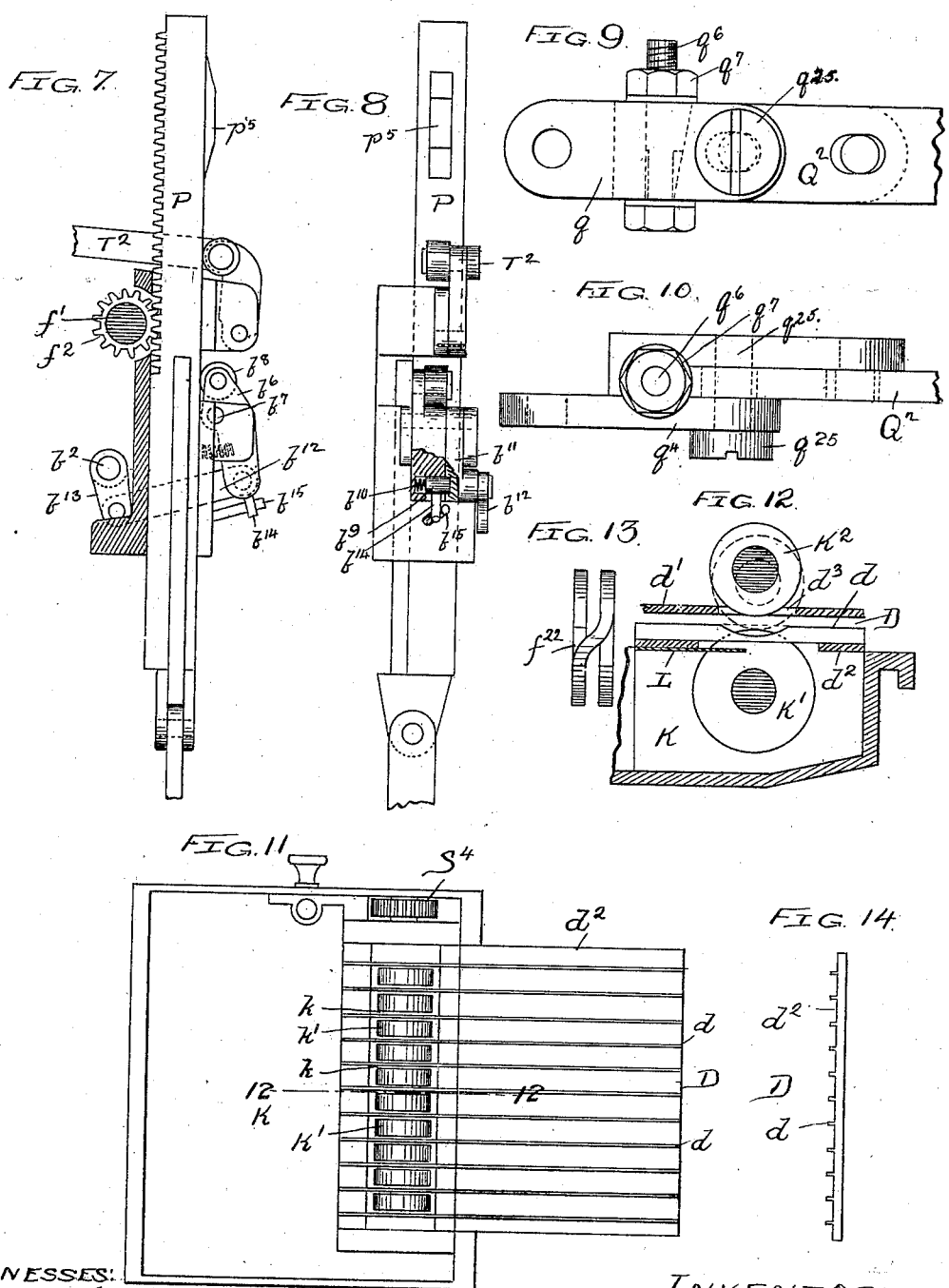

No. 709,499. Patented Sept. 23, 1902.
F. C. MORRISON.
CAN LABELING MACHINE.
(Application filed Sept. 25, 1895.)
(No Model.) 10 Sheets—Sheet 7.
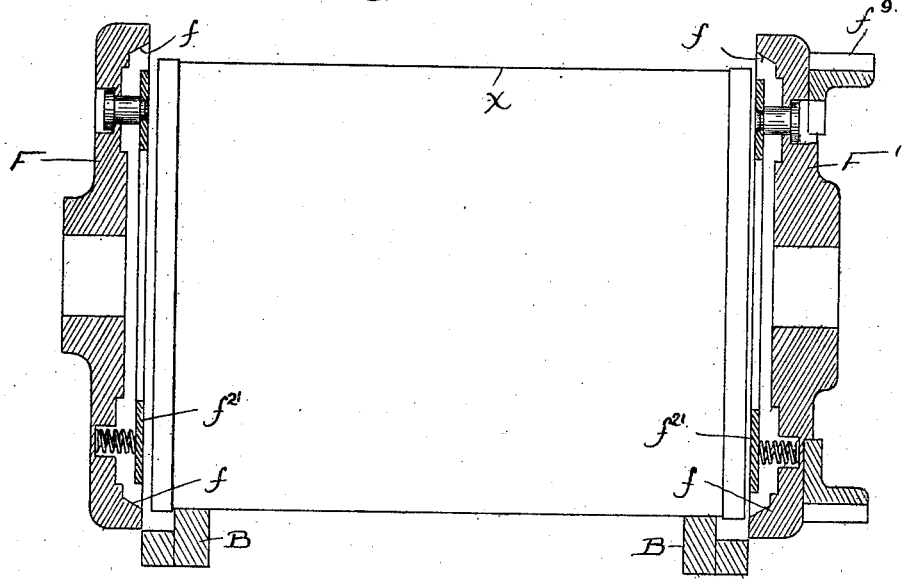
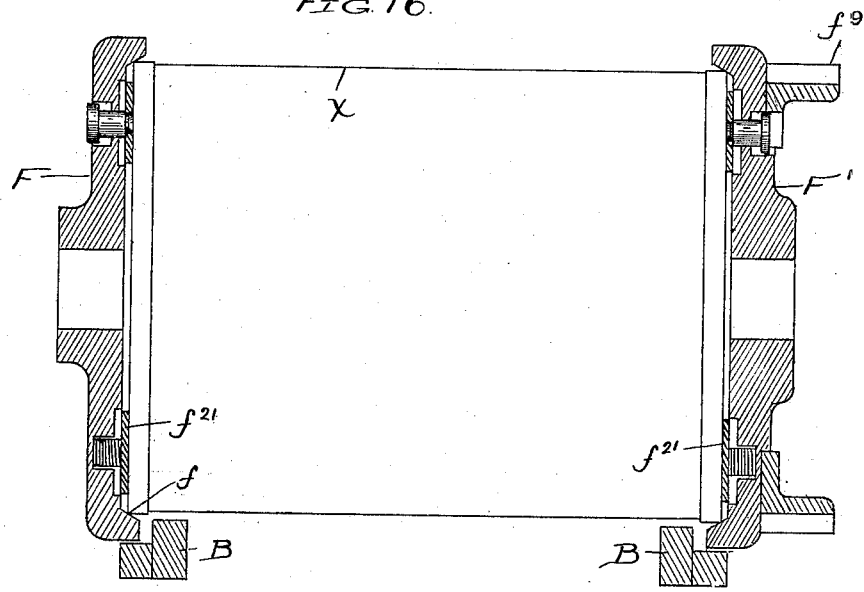
WITNESSES:
Geo. E. Curtis
H. W. Munday
INVENTOR:
Fred C. Morrison,
BY Munday, Evarts & Adcock,
HIS ATTORNEYS.

No. 709,499. Patented Sept. 23, 1902.
F. C. MORRISON.
CAN LABELING MACHINE.
(Application filed Sept. 25, 1895.)
(No Model.) 10 Sheets—Sheet 8.
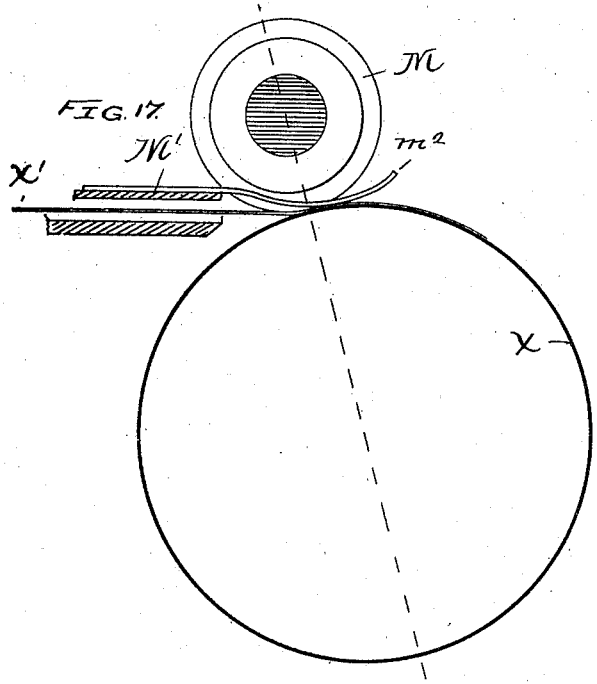
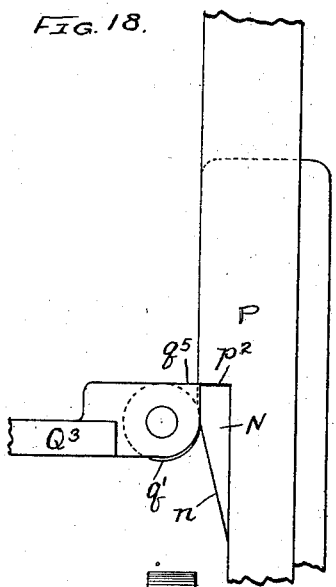
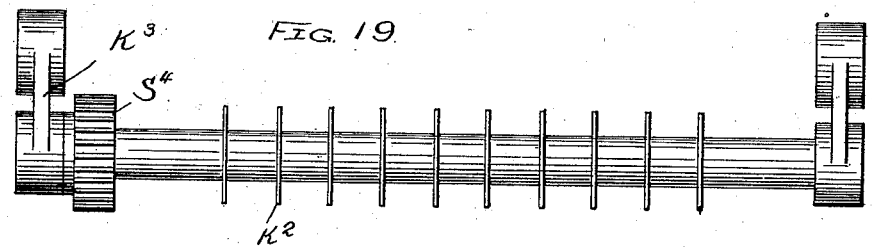
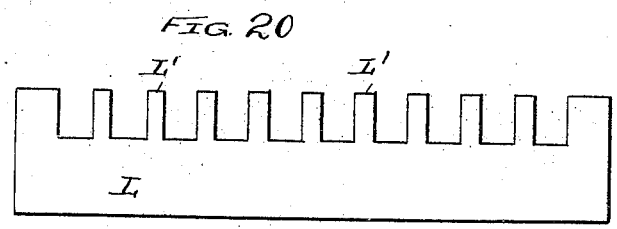
WITNESSES:
INVENTOR:
Fred C. Morrison
BY Munday, Evarts & Adcock
HIS ATTORNEYS.

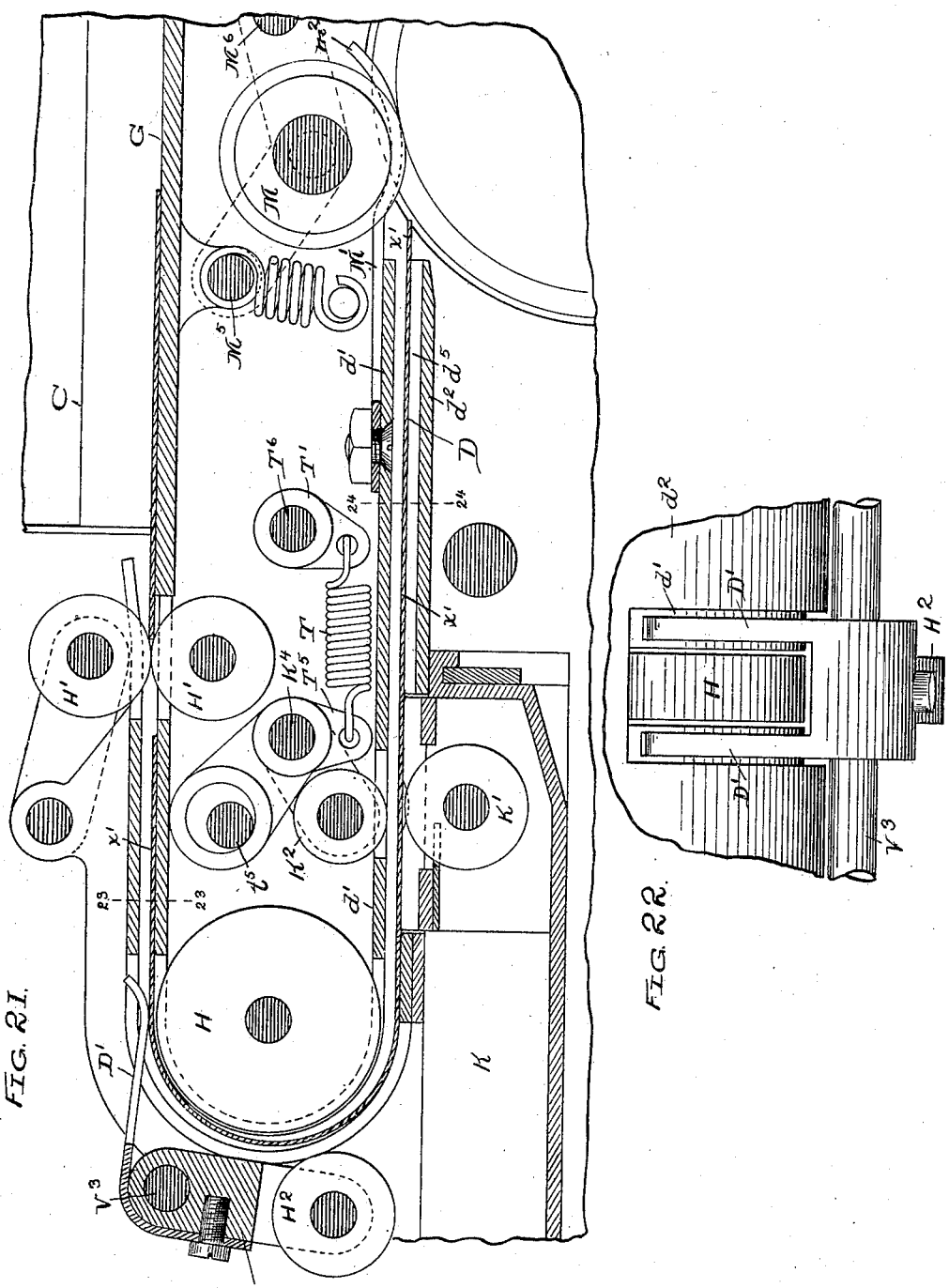

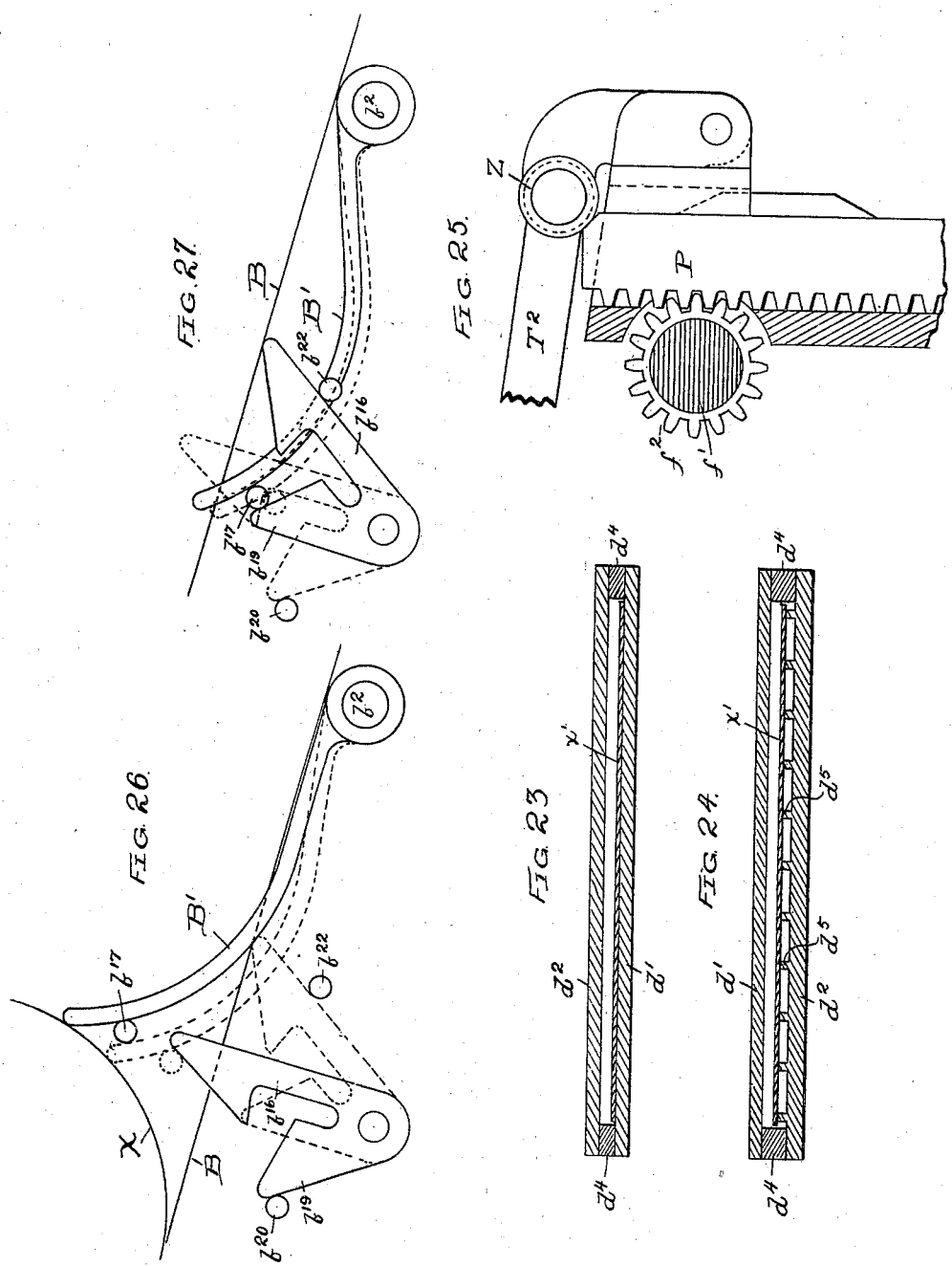

UNITED STATES PATENT OFFICE.

FRED C. MORRISON, OF CHICAGO, ILLINOIS.

CAN-LABELING MACHINE.

SPECIFICATION forming part of Letters Patent No. 709,499, dated September 23, 1902

Application filed September 25, 1895. Serial No. 563,575. (No model.)

*To all whom it may concern:*

Be it known that I, FRED C. MORRISON, a citizen of the United States, residing in Chicago, in the county of Cook and State of Illinois, have invented a new and useful Improvement in Can-Labeling Machines, of which the following is a specification.

My invention relates to machines for labeling cans.

The object of my invention is to provide a machine of a simple, durable, neat, and compact construction that will operate efficiently and with certainty and accuracy to securely, rapidly, and automatically paste labels upon cans.

The machine embodying my invention comprises in combination a receptacle for the labels, a feed-table for the labels, a removable receptacle or reservoir for the paste, an inclined track or pathway along which the cans may roll, stops for arresting the cans in position for being grasped by the can rotating and lifting chucks or disks, a pair of reciprocating and rotating chucks or disks adapted to clamp the can between them by its ends and lift the can from its track and rotate it upon its axis and finally to release it after the label has been applied, a track or pathway for the label, a feed roller or rollers for feeding the label along said track or pathway, a frictional stop for arresting the movement of the label in said track, a grooved paster-roller for applying the paste in strips to the inner face of the label, a correspondingly-grooved or composite disk pressure-roller for deflecting the label against the paste-roller, a grooved sealing-roller coöperating with the can for sealing or pressing the label securely thereon, a toothed spring guard or stripper operating to seal or press the label against the can at the interstices or grooves in the sealing-roller, and mechanism for giving the necessary movements automatically to the various movable parts or devices of the machine. The guideway or path for the labels is composed of a series of fingers or ribs extending longitudinally or in the direction of the movement of the label and registering with the grooves in the paste-roller, so that the unpasted surfaces or strips only of the label will come in contact with the stationary guides for the label, and thus prevent any tendency of the label to stick in its passage or guide way.

My invention consists in the novel construction of the several parts or devices which are combined together to form my improved machine and in the novel combinations and subcombinations of such parts and devices.

In the accompanying drawings, which form a part of this specification, and in which similar letters of reference indicate like parts throughout the several figures, Figure 1 is a side elevation of a machine embodying my invention. Fig. 2 is a plan view. Fig. 3 is an enlarged side elevation looking from the opposite side from that shown in Fig. 1. Fig. 4 is a central longitudinal vertical section taken on the line 4 4 of Fig. 2. Fig. 5 is a vertical cross-section on the line 5 5 of Fig. 2. Fig. 6 is a detail horizontal section on line 6 6 of Fig. 5. Figs. 7 and 8 are enlarged detail views of the rack and slide by which power is communicated to the machine from the foot-treadle. Figs. 9 and 10 are detail views of parts hereinafter to be described. Fig. 11 is a detail plan view of the paste pot or reservoir, showing also the pasting-roller and the lower guide for the label. Fig. 12 is a vertical section on line 12 12 of Fig. 11. Fig. 13 is a detail view of the cushioning-spring for the shaft of the chuck-disks. Fig. 14 is a detail end view of the label-guide. Figs. 15 and 16 are detail central sectional views of the chuck-disks by which the can is lifted from the truck and rotated upon its axis. Fig. 17 is a detail sectional view illustrating the form of the toothed stripper for the grooved sealing-roller. Fig. 18 is an enlarged detail view of the operating-rack and its slide and also showing the cam by which the transverse slide is operated. Fig. 19 is a detail view of the composite disk or sectional pressure-roll which coöperates with the grooved paste-roll, and Fig. 20 is a detail view of the toothed scraper for the paste-roll. Fig. 21 is an enlarged detail sectional view on the line 4 4 of Fig. 2, showing the label-track and label-conveying mechanism and the frictional stop for arresting the movement of the label. Fig. 22 is a detail plan view of the frictional stop and the yoke carrying it. Fig. 23 is a cross-sectional view of the label-track on line 23 23 of Fig.

21, and Fig. 24 is a cross-sectional view of the label-track on line 24 24 of Fig. 21. Fig. 25 is a detail view of the rack for operating the chuck-disks and the frictional stop and pressure-roll, showing some of the connecting mechanism. Figs. 26 and 27 are detail views showing a can-stop B' in different positions and illustrates its operation.

In the drawings, A represents the frame of the machine, which may be of any suitable construction.

B is the inclined track or way for the cans.

C is the receptacle for the labels; D, the track or guide for the labels; K, the reservoir or receptacle for the paste, and F F' the reciprocating and rotating chucks or disks by which the cans are gripped and rotated one by one.

The inclined track or way B, along which the can-bodies roll, is furnished with side guides $b$ $b$, placed slightly farther apart than the length of the cans, these side guides being in part or whole preferably integral with the frame. The can-track B is provided with two stops B' B$^2$, each consisting, preferably, of a hinged curved arm, adapted to be automatically lifted into the path of the cans, so as to stop or arrest the movement of the cans as they roll through the machine. One of these curved stop-arms is arranged to stop a can in position to register with the chuck-disks F F' and the other to arrest the succeeding can, so as to relieve the can which is being rotated by the chuck-disks from the pressure of or contact with other cans on the can-track B. These stop-arms are preferably given about the same curvature as that of the periphery of the cans being operated upon, as I am thus enabled to place the stops closer together without causing them to interfere with the cans and make the machine more compact. The chucks F F' have two movements, one a reciprocating movement to and from each other to cause them to clamp and release the can and also to lift the can free from contact with the can-track B by reason of the conical or tapering faces $f f$ of the chuck-disks, and the other a rotating movement on their axes to cause the can to rotate. The chuck-disks F F' are further provided each with a spring-actuated extractor plate or ring $f^{21}$ $f^{21}$ for the purpose of forcing the can-body out of the tapering or conical socket in the face of the chuck-disk, so as to enable the can-bodies to roll or drop freely and squarely out from between the chuck-disks when they are withdrawn or separated to release the can.

The track or guide D for the label extends from the feed-table G and recurves under itself around the feed-roller H, so that the under portion of the track extends in the opposite direction from the upper portion. By thus doubling the label track or guide upon itself I save a great deal of room and am enabled thus to materially reduce the size and cost of the machine, especially as to the frame.

The track D has an upper and lower guide, between which the labels pass.

H' H' are a pair of feed-rollers at the mouth of the label-track, and H$^2$ is a feed-roller operating in conjunction with the feed-roller H, around which the labels turn.

K is the removable receptacle or pot for containing paste, and K' is the paste-roller, the same being made sectional or with grooves $k$ $k$, so that the paste-roller can only come in contact with the label and apply paste thereto in strips or lines extending longitudinally of the label. The paste-roller K' is journaled in suitable bearings in the paste pot or receptacle K, and it is so located or combined in relation to the lower guide $d$ of the label-track D that the surface of the paste-roller is slightly below the surface of this guide on the path of the label, and the sectional or composite disk pressure-roll K$^2$ is so arranged that its periphery when lowered projects slightly below the path of the label, as is clearly illustrated in Fig. 12 in dotted lines. The sectional or composite disk pressure-roll K$^2$ thus deflects the label slightly out of its straight path and presses it against the grooved paste-roll, and thus causes the label to take paste in longitudinal strips. By this means the label is caused to take paste from the paste-roll only when the pressure-roll is in position to deflect the label and press it against the paste-roll. The pressure-roll is movable, and the paste may be applied thus to a greater or less length on the label, as desired. Its rotary movement is automatically controlled by the presence or absence of the can between the chuck-disks F F', so that in case no can is present and a label should be fed the label will not pass through the machine nor have paste applied to it. This prevents smearing the machine with paste and consequent soiling of the cans or of the labels applied to the cans and the interference with the proper operation of the machine.

The lower guides $d$ of the label-track D consist of a series of narrow ribs or strips registering with the grooves in the paste-roller, so that this guide will only bear upon the label at the unpasted surfaces or strips thereof. This prevents the paste on the label from interfering with the free passage of the label along its track or pathway. The opposite guide $d'$ of the label-track may be likewise composed of strips, ribs, or fingers, so as to better coöperate with the strips, ribs, or fingers of the lower guide $d$. The upper and lower guide-plates $d^2$ and $d^3$ of the label-track D are cut away to permit the sections or disks of the grooved paste-roll K' and of the pressure-roll K$^2$ to project through the same, and these guide-plates are also cut away at the feed-rolls H H' H$^2$ to permit the surface of the feed-rolls to come in contact with the label; but the guide ribs or fingers $d$ $d'$ of the track extend between the sections or disks of the paste-roll K' and pressure-roll K$^2$, so that the guide or pathway for the label may be continuous and no opportunity left for the front edge of the label to catch or meet an obstruction. The sectional or composite disk pressure-roller $K^2$ being mounted normally above the sectional or grooved paste-roller $K'$, and so that the sections or disks of the pressure-roll register with the grooves in the grooved or sectional paste-roller, enables the sections or disks of the pressure-roll to be always kept clean and not become smeared with paste when the roll is lowered whether a label is present within the label-track or not. The label-track is thus composed substantially of two inclosing guide-plates $d'$ and $d^2$, separated by the strips $d^4$, which also act as guides for the label and extend the full length of the label-track, so that the label therefore has guides on both sides and edges. The plate $d'$ is continuous, extending from the feed-table G to the sealing-roll. The plate $d^2$ extends from the feed-table G to the portion of the label-track secured to the paste-receptacle shown in Fig. 12. The guide-plate $d'$ and $d^2$ are cut away at the feed-rolls H', H, and $H^2$ to permit the surface of the feed-rolls to come in contact with the label. At the feed-roll H, as will be seen in Fig. 22, the width of the space cut out of the guide-plate $d^2$ is greater than cut out of the plate $d'$, the reason for which is to allow the frictional label-stop D' to project through and press the label at the proper time in contact with the guide-plate $d'$. The guide-plate $d'$ is also cut away at the pressure-roll $K^2$ in order to permit the sections or disks of the pressure-roll to project through. The portion of the label track or guide which is secured to the paste-receptacle K is composed of a series of strips or fingers $d$, projecting through the grooves in the paste-roll K'. These guide strips or fingers registering with the sections or disks of the pressure-roll $K^2$ are cut or arched out, as shown in Fig. 12, in order to permit the pressure-roll at the proper time to lower and deflect the label into contact with the grooved paste-roller. The lower portion of the label-track $d^2$ extending from the paste-receptacle to the sealing-roll is composed as shown in Fig. 24, of a plate $d^2$ having a series of narrow ribs or strips $d^5$ running parallel with the course of the label and registering with the groove $k$ in the paste-roll; therefore these ribs or strips come in contact only with the unpasted strips of the label, thus preventing the pasted part of the label from coming in contact with any part of the label-track $d^2$ and assuring the free passage of the label to the can.

In order to arrest the label X' in proper position along its track or way D to properly and regularly apply it to the can, I provide the label-track D with a movable frictional stop D', preferably made in the form of a curved flat spring, which is adapted to engage the label and arrest its movement by pressing it in contact with the stationary guide-plate $d'$ of the label-track, as shown in Figs. 21 and 22, and again automatically release it, and for the same reason the feed-roller $H^2$ is mounted movably, so that it may be moved into and out of contact with its companion feed-roller H.

L is a scraper for the paste-roller. This scraper is made notched or furnished with teeth L', which project into the grooves of the paste-roller, so that the sections or disks of this paste-roll will be scraped and kept clean at their side faces or end surfaces and be uniformly coated with paste at their peripheries.

M is the sealing-roller, which operates to seal or press the label against the can X as the latter is rotated on its axis by the revolving chuck-disks F F'. This sealing-roller is made sectional or grooved, its grooves $m$ and sections $m'$ corresponding to and being arranged in line with the grooves $k$ and sections $k'$ of the paste-roll K'. The purpose of making this sealing-roller grooved or sectional is to give room for the spring-teeth $m^2$ of the guard M', which serves to prevent the label winding around the sealing-roller and also to press or seal the label at the interstices or strips between the sections of the sealing-roller. This guard M' is preferably curved, about as shown in Fig. 17, and is extended so as to bear against the label on the can at a point beyond the point where the sealing-roller leaves the can, as is clearly illustrated in Fig. 17, so as to insure the front edge of the label being held down properly against the periphery of the can and also to prevent the rear edge of the label being caught or turned back by the sealing-roller. This construction and operation will be readily understood by those skilled in the art from Fig. 17.

In order to compensate for irregularity or inaccuracy in the shape of the can or eccentricity in the clamping of the same between the clutch-disks F F', I mount the sealing-roller M in a movable or swinging yoke or frame $M^2$, connected by the cross-bars or the rods $M^5$ $M^6$, and pivoted at $M^8$ to the frame of the machine and held yieldingly in position to engage the can by springs $M^4$. As the guard M' or its teeth $m^2$ are made of spring metal, they are thus adapted to accomplish this function also. The mounting of the sealing-roller in a movable or swinging yoke or frame, it will be seen, also adapts the machine to operate upon cans of any shape, whether cylindrical or square. The inclination of the can-track, however, will want to be increased for cans of such shape as will not roll.

N is a reciprocating slide connected by a link N' with a foot-lever $N^2$ or other source of power, from which motion is communicated to the several moving parts of the machine by suitable connecting mechanism.

The axis of the chuck-disks is located in such a position in relation to the can-track B, the can-stop $B^2$, the sealing-roller M, and the guard $M'$ that the chuck-disks by reason of their special location and tapering faces $f\ f$ in the act of gripping the can raise it clear of and away from the can-track B and the can-stop $B^2$ into contact with and slightly raising the sealing-roller M, which is mounted on its movable yoke or frame $M^2$ and also raises the spring-teeth $m^2$ of the guard $M'$, thus causing the can when revolving to be free from the can-track and from the can-stop, while having a yielding contact with the sealing-roller and the guard $M'$. This enables the can to be properly revolved in contact with the sealing-roller and to have the proper yielding pressure against it. The required rotary movement is communicated to the chuck-disk F or its shaft $f'$ by means of a reciprocating rack P which meshes with a gear $f^2$ on the chuck-disk shaft $f'$ and which is connected with and operated by the slide N; the rack P however being so mounted on the slide that it may have a reciprocating movement independent of the slide. The rack P is mounted in suitable guideways $P'$, and is provided with a slot or guide in which the slide N fits so that the rack may reciprocate independently of the slide. Rotary movement is communicated to the other chuck-disk $F'$ on its shaft $f'$ only when a can is chucked between the two disks F $F'$ and by and through the agency of the can itself; and as the label feeding, pasting and sealing mechanism is so arranged as to receive its motion only from, through or by this other chuck-disk $F'$ or its shaft $f'$ it will be seen that unless a can is present between the chuck-disks ready for the label to be applied thereto, no label will be fed. The presence or absence of the can thus controls the operation of the label feeding and applying mechanism. The necessary reciprocating movement is communicated to the chuck-disks F $F'$ or to their shafts $f'\ f'$ to cause them to lift the can from the can-track B and to chuck or grasp the can firmly between them by means of a pair of levers Q Q, pivoted at $q$ to the frame of the machine and connected to collars $f^4\ f^4$, loose on the shafts $f'\ f'$, the loose collars on each shaft being kept in place longitudinally thereon by fixed collars $f^5\ f^6$. To diminish friction a ball-bearing $f^7\ f^8$ is inserted between the loose collar and the inward fixed collar. The levers Q Q are connected together, so as to be operated equally and simultaneously by an intermediate lever $Q'$ and connecting-links $Q^2\ Q^2$. The intermediate lever $Q'$ is operated by a cam $n$ on the slide N engaging a transversely-moving slide $Q^3$ or a friction-roller $q'$ thereon, this transverse slide $Q^3$ being provided with a pivoted pawl $q^2$, which engages the upper end of the lever $Q'$. The cam $n$ on the slide N thus moves the chuck-disks F $F'$ toward each other or in a direction to grasp the can between them. They are returned or moved in the opposite direction by a spring $Q^5$, attached to the intermediate lever $Q'$. A spring $q^3$, attached to the pawl $q^2$, holds the pawl in position for engagement with the lever $Q'$ and also operates to return or retract the transverse slide $Q^3$ to position. The rack P is mounted in suitable guideways $P'$ on the frame of the machine and itself is furnished with a guide or slot in which the slide N fits, so that the rack may reciprocate independently of the slide. This independent reciprocating movement of the rack in respect to the slide is limited by pins or projections $p'\ p'$ on the rack, which fit in slots $n'\ n'$ in the slide, and which pins and slots also serve to connect the slide and rack together, but permitting the movement of one in respect to the other, limited by the length of the slot. The transverse slide $Q^3$ is provided with a corner or projection $q^5$, adapted to fit under and engage a corner or projection $p^2$ on the rack P, and thus hold the rack stationary until the cam $n$ on the slide N has moved the transverse slide $Q^3$ sufficiently to cause the chuck-disks F $F'$ to lift the can from its track or way and to firmly grasp or chuck it between them before the rack P can have any reciprocating movement or begin to rotate the can. By this means it will be seen that the can is firmly chucked between the disks F $F'$ and also lifted from its track before the chuck-disks begin to rotate. This insures the grasping of the can in proper position with certainty and accuracy. In order to release or withdraw the pawl $q^2$ on the transverse slide $Q^3$ from engagement with the intermediate lever $Q'$, and thus permit the spring $Q^5$ to retract the chuck-disks and release the can after it has been rotated sufficiently to apply the label thereto, I provide the rack P with a pawl $p^3$, held in place by a spring $p^4$, and which at or near the end of the downward stroke of the rack engages the free end of the pawl $q^2$ on the transverse slide $Q^3$. By this means the chuck-disks are withdrawn and the can released and discharged before the rack begins its upward stroke, and thus causes the chuck-disk F to rotate in the opposite direction.

In order to properly adjust the relative position of the chuck-disks F $F'$ to each other in respect to the can being operated upon, I provide the connecting-links $Q^2\ Q^2$ each with an adjustable member $q^4$, connected together by a clamp-bolt $q^{25}$, one of the members being slotted to receive the clamp-bolt, and the adjustable joint thus formed is provided with an adjusting screw and wedge $q^6$ and nut $q^7$, by which the length of the link as a whole may be lengthened or shortened. In order to accommodate slight variations in the length of the cans, a flat spiral spring $f^{22}$ is inserted between the loose collar $f^4$ and the fixed collar $f^6$.

The two curved stops $B'\ B^2$ in the can-track B are each preferably secured to a rock-shaft $b^2$, the two rock-shafts being furnished with arms $b^3\ b^3$, connected together by a link $b^4$, so that the two stops may be operated simultaneously. The stops are automatically lifted into position for arresting the movement of the cans by one or more springs, preferably one, $b^5$. The stops are automatically retracted into position to permit the cans to pass along the track B by means of a cam $p^5$ on the rack P, which engages a lever $b^6$, pivoted at $b^7$ to the frame, preferably furnished with a friction-roller $b^8$. This lever $b^6$ is furnished with a movable locking-bolt $b^9$, actuated by a spring $b^{10}$ and which serves to lock this lever $b^6$ with a companion lever $b^{11}$, also pivoted to the frame at $b^7$ and which is connected by a link $b^{12}$ with an arm $b^{13}$ on the rock-shaft $b^2$ of one of the stops B'. The locking-bolt $b^9$ on the lever $b^6$ is withdrawn from engagement with the companion lever $b^{11}$ by means of an arm $b^{14}$, connected with the locking-bolt, engaging a stationary cam $b^{15}$ on the frame of the machine when the rack P reaches the end of its downward stroke and after the stops have been retracted by the cam $p^5$, operating the lever $b^6$ $b^{11}$. The stops are set or held in their retracted position by means of a pawl $b^{16}$ engaging a pin $b^{17}$ on one of the stops. This pawl is pivoted to the frame and is held in position by a spring $b^{18}$. The pawl or a projection on the pawl projects up in the path of the can moving along the track B, so that the passage of the can itself will trip the pawl by reason of the can striking against the pawl as it moves along the track, and thus tilting or moving the pawl, release the stops $B^2$ B', and permit their springs to lift them into position for arresting the movement of the cans. As the spring for holding this pawl $b^{16}$ in position must be light in order to insure its being tripped with certainty by the passage of the cans and as the stops are held retracted only a momentary interval by the cam $p^5$ and the levers $b^6$ $b^{11}$. I provide this pawl $b^{16}$ with a cam or nose $b^{19}$, which will be engaged by the pin $b^{17}$ on the stop, so as to positively and automatically tilt or move the pawl into engagement with said pin $b^{17}$.

The operation of the automatic can-stop B' and the retaining-pawl $b^{16}$ is more clearly shown by referring to Figs. 26 and 27. The stop B' and the pawl $b^{16}$ are shown in their normal position in Fig. 26. The lowering or retraction of the stop is so rapid that when the pin $b^{17}$ strikes the pawl it is thrown against the stop-pin $b^{22}$, the dotted lines thus showing the relative position of the stop and pawl at that instant. In Fig. 27 the stop is shown still further retracted, the pin $b^{17}$ striking the cam or part $b^{19}$ and automatically returning the pawl to its normal position against the stop-pin $b^{20}$ and engaging the pin $b^{17}$, thereby holding the stop in its retracted position, ready to be released by the passage of the can, as shown by the dotted lines in Fig. 27.

The necessary rotary movement is communicated to the sealing-roller M by means of a gear $f^9$ on the disk F' or its shaft $f'$, which meshes with a gear $k^2$ on the shaft of the sealing-roller. The necessary rotary movement is communicated to the first pair of feed-rollers H' H' from the chuck-disk F' on its shaft $f'$ by means of this same gear $f^9$, the intermediate gears S S, one of which meshes with a gear S' on the shaft of one of the feed-rollers H', the shaft of the other feed-roller H' being also furnished with a gear $S^2$, meshing with the gear S'. Rotary motion is communicated to the grooved paste-roller K' and to the sectional or composite disk pressure-roller $K^2$ by means of the intermeshing gears $S^3$ $S^4$ $S^5$, the gear $S^3$ meshing with the gear S', and to the feed-roller H through the intermeshing gears $S^6$ $S^7$ $S^8$, the gear $S^6$ meshing with the gear $S^3$. The feed-roller $H^2$ is driven simply by contact with its companion feed-roller H. The necessary vibratory movement is communicated to the sectional or composite disk pressure-roller $K^2$ by mounting it in a swinging frame or yoke composed of the arms or bearings for the pressure-roller $K^2$, secured to the rock-shaft $K^4$, which has bearings in the frame of the machine. Secured to the rock-shaft $K^4$ are two arms or levers $T^5$ $T^5$, the top portion $t^5$ $t^5$ of which act as stops for limiting vibratory movement of the pressure-roller $K^2$. The arms or levers $T^5$ $T^5$ are connected by the closed springs T T with the arms T' T', secured to the rock-shaft $T^6$. Secured to the rock-shaft $T^6$ is also the arm or lever $T^7$, which is operated by the cam $p^5$ on the rack P through the connecting-links $T^2$. A spring $T^3$ serves to move the lever $T^7$ in the opposite direction. The swinging frame or yoke carrying the pressure-roller $K^2$ is retracted or raised during the time that paste is not being applied to the label by two springs mounted on the rock-shaft $K^4$, similar to the springs O O. (Shown in Fig. 2.) The frictional stop D' for the label-track and the feed-roller $H^2$ are both mounted on a vibrating frame or yoke V, which is secured to the rock-shaft $V^3$. Secured to the rock-shaft $V^3$ is also the lever $V^4$, which is connected to the lever $T^7$ by the link $V^2$, which is slotted at the end connected with the lever $T^7$, so that the motion of the lever $T^7$ sufficient to lower the pressure-roller $K^2$ does not move the link $V^2$; but when the rack P is at the end of its downward stroke it permits the spring $T^3$ to draw the friction-roller Z, connected to the link $T^2$, over the top end of the rack, as shown in Fig. 25, and thereby moving the vibrating yoke V sufficiently to disengage the feed-roll $H^2$ with its companion roller H and allowing the frictional label-stop D' to engage the label, pressing it against the stationary plate $d'$, therefore arresting its movement, the vibrating frame or yoke V being moved in the opposite direction by the spring V'.

U is the delivery-chute and U' the discharge-chute, one connecting with the inlet end of the can-track B and the other with the outlet end thereof.

The operation of the machine is as follows:

Cans having been placed on the inclined delivery-track U, the foremost one upon passing into the machine trips the pawl $b^{16}$, allowing the spring $b^5$ to raise the automatic stops B' and B² in time to arrest the movement of the cans, so that the foremost one stops between the chucking-disks F and F'. The operator taking a label from the label-receptacle C located slightly above and just back of the feed-table G, places it against a guide-strip thereon in contact with the feed-rollers H' H'. Then depressing the foot-lever N² connected by the rod N' to the link N, which in lowering by means of the cam $n$, the transverse slide and the link and lever connections cause the chucking-disk to grip the can endwise, at the same time lifting it free from the can-track B and the stop B' into contact with the sealing-roller M and the guard M'. After the can is securely gripped between the chuck-disks it receives its rotary motion by means of the rack P, connected to the slide N, engaging the pinion $f^2$, secured to the spindle $f'$, upon which is mounted the chuck-disk F. Secured to the opposite chuck-disk F' is the gear $f^9$, from which by use of suitable gearing rotary motion is communicated to the sealing-roller, the feed-rollers H, H', and H², the pressure-roll K², and the paste-roller K'. Thus it will be seen as the rack lowers and the can revolves the feed-rollers H' H' cause the label to enter the label-track D, passing between the feed-rollers H and H² and around the roller H. The cam $p^5$ on the rack being so located and of such a length that it by engaging the friction-roller Z causes it by means of suitable link-and-lever connection to lower the pressure-roller K² shortly before the foremost end of the label reaches the paste-roller. Therefore when the label reaches the paste-roller it is deflected into contact with it for a sufficient length of time to allow the label to take paste for a short distance at its foremost end, the pressure-roller then raising and the label passing along its track or guideway until the rack has reached the end of its downward stroke, at which point the friction-roller Z is drawn over the top end of the rack, as shown in Fig. 25, by the spring T³, which by means of the link-and-lever connections disengage the feed-roller H² with the roller H and engage the frictional stop D' with the surface of the label, thereby arresting its movement when in the position as shown in Fig. 21, X' representing the label. As the rack reaches the end of its downward stroke it also, by means of the pawl $p^3$, the spring $Q^5$ and the other link-and-lever connection withdraws the chuck-disks, thus releasing the can, which drops on the track B and rolls out onto the discharge-track U'. The stops B' and B² having been previously lowered by the engagement of the cam $p^5$ on the rack with the friction-roller $b^8$ operating the stops by means of the link-and-lever connections. The foot-lever and rack being returned to their original position by means of a spring mounted within the column. It will be seen that no label is attached to the first can that passes through the machine, but simply enables the first label to be fed into the label-track or guideway and having its foremost end pasted ready to pass under the sealing-roller, and thus be attached to the next-following can. The back or lap end of the label receiving its paste when the presser-roller lowers in order to apply paste to the foremost end of the next-following label, therefore the labels, one being fed at each downward stroke of the rack, follow each other, one close behind the other. Thus after the first can is discharged a label is applied to a can at each downward stroke of the rack.

I claim—

1. In a can-labeling machine, the combination with a receptacle for the labels, of a feed-table, a paste pot or receptacle, an inclined track for the cans, a pair of reciprocating and rotating chuck-disks having tapering or bevel faces for lifting the cans from the can-track and rotating the same, stops for arresting the cans in position for being grasped by said chuck-disks, a track or guide for the labels, feed-rollers for the labels, a stop for arresting the movement of the label along its track, a grooved paste-roller for applying the paste in strips to the inner face of the label, a correspondingly-grooved pressure-roller for deflecting the label against the paste-roller, a grooved sealing-roller, a toothed spring guard or stripper fitting in and projecting through the grooves of the sealing-roller, a scraper for the paste-roller, and mechanism for operating said parts or devices, substantially as specified.

2. In a can-labeling machine, the combination with a track for the can, and a sealing-roller, of a pair of reciprocating and rotating chuck-disks furnished with tapering or beveled faces to lift the can from the can-track and into contact with the sealing-roller and rotate it upon its axis, substantially as specified.

3. In a can-labeling machine, the combination with the track for the can and a sealing-roller, of a pair of reciprocating and rotating chucks furnished with tapering or beveled faces for lifting the can out of contact with the track and into contact with the sealing-roller and for grasping and rotating the can, and a pair of automatically-operating curved stop-arms, substantially as specified.

4. In a can-labeling machine, the combination with a can-track, of a pair of chuck-disks furnished with tapering or beveled faces to lift the can out of contact with the track and into contact with the sealing-roller and for grasping and rotating the can, a sealing-roller and a label-track doubled or recurved upon itself, feed-rollers and a paste-roller, substantially as specified.

5. In a can-labeling machine, the combination with a can-track and a pair of chuck-disks furnished with tapering or beveled faces to lift the can out of contact with the track and into contact with the sealing-roller and for rotating the can, of a grooved or sectional sealing-roller, and guard or stripping-fingers fitting in and projecting through the grooves of the sealing-roller, substantially as specified.

6. In a can-labeling machine, the combination with a pair of chuck-disks for rotating the can, of a grooved or sectional sealing-roller, and a guard or stripping-fingers fitting in and projecting through the grooves of the sealing-roller, said stripper-fingers projecting beyond the point of contact between the sealing-roller and the can, and curved so as to bear against the can and prevent the label winding around the sealing-roller, substantially as specified.

7. In a can-labeling machine, the combination with a pair of rotatable chucks for grasping and rotating the can, rollers for pasting the labels and feeding them to the can, mechanism for rotating the can connected with one of said chuck-disks, and mechanism for driving and rotating the feed and paste rollers connected to the other of said chuck-disks, so that the label feeding and pasting mechanism can only be driven when a can is present between the chuck-disks to communicate rotary motion from one to the other, substantially as specified.

8. In a can-labeling machine, the combination with a driven chuck-disk and a loose chuck-disk adapted to rotate with a can when the can is grasped between the chuck-disks, and a device for feeding the label and operating mechanism connecting it with the loose chuck-disk, so that the label will only be fed when the can is present, substantially as specified.

9. In a can-labeling machine, the combination with a track for the cans and a sealing-roller, of a pair of reciprocating and rotating chuck-disks furnished with tapering or beveled sockets for securing the can and lifting it from the can-track and into contact with the sealing-roller, and spring-ejector disks or plates to insure the proper discharge of the can from the chuck-disks to the track, substantially as specified.

10. In a can-labeling machine, the combination with a pair of rotating chuck-disks, of a track for the can, a pair of movable stops to arrest the cans in the track, a spring for lifting the stops, a pawl for holding the stops retracted projecting into the path of the cans in the track, and provided with a cam or nose adapted to be engaged by a pin on the stop for moving the pawl, substantially as specified.

11. In a can-labeling machine, the combination with a paste-receptacle, of a grooved or sectional paste-roller and a grooved or sectional pressure-roller, the sections of the pressure-roller registering with the grooves of the paste-roller, and a track for the label having a series of lower guide-strips fitting in and projecting through the grooves of the paste-roller, said paste-roller being below the surface of said track, a track for the cans and a pair of revolving and reciprocating chuck-disks furnished with tapering or beveled faces to lift the can out of contact with the track and into contact with the pressure-roller, substantially as specified.

12. In a can-labeling machine, the combination with a paste-receptacle, of a grooved or sectional paste-roller and a grooved or sectional pressure-roller, the sections of the pressure-roller registering with the grooves of the paste-roller, a track for the label having a series of lower guide-strips fitting in and projecting through the grooves of the paste-roller, and having an upper guide with slots or openings cut through it for the disk or sections of the pressure-roller to project through said paste-roller being below the surface of said track, a track for the cans and a pair of revolving and reciprocating chuck-disks furnished with tapering or beveled faces to lift the can out of contact with the track and into contact with the pressure-roller, substantially as specified.

13. In a can-labeling machine, the combination with a paste-receptacle, of a grooved or sectional paste-roller and a grooved or sectional pressure-roller, the sections of the pressure-roller registering with the grooves of the paste-roller, a track for the label having a series of lower guide-strips fitting in and projecting through the grooves of the paste-roller, and having an upper guide with slots or openings cut through it for the disks or sections of the pressure-roller to project through, said paste-roller being below the label-track, and the pressure-roller being mounted movably so that a label may pass over said paste-roller without having paste applied thereto except when the pressure-roller is depressed, substantially as specified.

14. In a can-labeling machine, the combination with a paste-receptacle, of a grooved or sectional paste-roller and a grooved or sectional pressure-roller, the sections of the pressure-roller registering with the grooves of the paste-roller, a track for the label having a series of lower guide-strips fitting in and projecting through the grooves of the paste-roller, and having an upper guide with slots or openings cut through it for the disks or sections of the pressure-roller to project through, said paste-roller being below the label-track, and the pressure-roller being mounted movably so that a label may pass over said paste-roller, and means for automatically depressing said pressure-roller at intervals, substantially as specified.

15. In a can-labeling machine, the combination with the track for the cans, of rotating chuck-disks for revolving the cans furnished with bevel-faces for lifting the cans out of contact with said can-track and into contact with the sealing-roller, a track for the labels, feed-rollers for feeding the labels along said track, a paste-pot, paste-roller and sealing-roller, and a movable frictional stop engaging the surface of the label for arresting the label in a certain position along said track before being applied to the can, substantially as specified.

16. In a can-labeling machine, the combination with the track for the cans, of rotating chuck-disks for revolving the cans furnished with bevel-faces for lifting the cans out of contact with said can-track and into contact with the sealing-roller, a track for the labels, feed-rollers for feeding the labels along said track, a paste-pot, paste-roller, and sealing-roller, and a movable frictional stop engaging the surface of the label for arresting the label in a certain position along said track before being applied to the can, one of said feed-rollers being movable to permit the movement of the label to be so stopped, substantially as specified.

17. In a can-labeling machine, the combination with the track for the cans, of rotating chuck-disks for revolving the cans furnished with bevel-faces for lifting the cans out of contact with said can-track and into contact with the sealing-roller, a track for the labels, feed-rollers for feeding the labels along said track, a paste-pot, paste-roller and sealing-roller, and a movable frictional stop engaging the surface of the label for arresting the label in a certain position along said track before being applied to the can, one of said feed-rollers being movable to permit the movement of the label to be so stopped, a vibratory yoke upon which said stop and feed-roller are mounted, and means for automatically vibrating said yoke, substantially as specified.

18. In a can-labeling machine, the combination with the track for the cans, of rotating chuck-disks for revolving the cans, a track for the labels, feed-rollers for feeding the labels along said track, a paste-pot, paste-roller and sealing-roller, and a movable stop for arresting the label in a certain position along said track before being applied to the can, one of said feed-rollers being movable to permit the movement of the label to be so stopped, a vibratory yoke upon which said stop and feed-roller are mounted, means for automatically vibrating said yoke, a movable pressure-roller coöperating with said paste-roller, and means for automatically vibrating said pressure-roller, substantially as specified.

19. In a can-labeling machine, the combination with a track for the cans, of chuck-disks for rotating the cans and having bevel-faces for lifting the cans out of contact with said track and into contact with the sealing-roller, a grooved or sectional sealing-roller, a paste pot or receptacle, a grooved or sectional paste-roller, a sectional pressure-roller, and a curved spring-toothed stripper or guard projecting between the sections of the sealing-roller, substantially as specified.

20. In a can-labeling machine, the combination with a track for the cans of chuck-disks for rotating the cans and having bevel-faces for lifting the cans out of contact with said track and into contact with the sealing-roller, a grooved or sectional sealing-roller, a paste pot or receptacle, a grooved or sectional paste-roller, a sectional pressure-roller, a curved spring-toothed stripper or guard projecting between the sections of the sealing-roller, and two automatically-operated stops in the can-track for stopping the cans in position, substantially as specified.

21. In a can-labeling machine, the combination with a track for the cans, of chuck-disks for rotating the cans, a grooved or sectional sealing-roller, a paste pot or receptacle, a grooved or sectional paste-roller, a sectional pressure-roller, a curved spring-toothed stripper or guard projecting between the sections of the sealing-roller, a track for the labels, feed-rollers for the labels, and a movable stop for the labels, substantially as specified.

22. In a can-labeling machine, the combination with a track for the cans, of chuck-disks for rotating the cans, a grooved or sectional sealing-roller, a paste pot or receptacle, a grooved or sectional paste-roller, a sectional pressure-roller, a curved spring-toothed stripper or guard projecting between the sections of the sealing-roller, and two automatically-operated stops in the can-track for stopping the cans in position, a track for the labels, feed-rollers for the labels, and a movable stop for the labels, substantially as specified.

23. In a can-labeling machine, the combination with a track for the cans, and having bevel-faces for lifting the cans out of contact with said track and into contact with the sealing-roller, of chuck-disks for rotating the cans, a grooved or sectional sealing-roller, a paste pot or receptacle, a grooved or sectional paste-roller, a sectional pressure-roller, a curved spring-toothed stripper or guard projecting between the sections of the sealing-roller, a track for the labels and feed-rollers for the labels, said track for the labels having a lower guide comprising a series of narrow strips or fingers registering with the grooves of the paste-roller, substantially as specified.

24. In a can-labeling machine, the combination with a track for the cans, of chuck-disks for rotating the cans, a grooved or sectional sealing-roller, a paste pot or receptacle, a grooved or sectional paste-roller, a sectional pressure-roller, a curved spring-toothed stripper or guard projecting between the sections of the sealing-roller, two automatically-operated stops in the can-track for stopping the cans in position, a track for the labels and feed-rollers for the labels, said track for the labels having a lower guide comprising a series of narrow strips or fingers registering with the grooves of the paste-roller, substantially as specified.

25. In a can-labeling machine, the combination with a track for the cans, of two reciprocating and rotating bevel-faced chuck-disks for lifting the can from the track and rotating the same, a reciprocating slide furnished with a cam to impart to the chuck-disks their reciprocating movement, and a reciprocating rack carried by said slide and having an independent reciprocating movement thereon for imparting to said chuck-disks their rotary movement whereby said chuck-disks are reciprocated or closed before being rotated, substantially as specified.

26. In a can-labeling machine, the combination with rotating and reciprocating chuck-disks F F', of operating-slide N, having a cam $n$, independently-reciprocating rack P carried by said slide N, levers Q Q connected to the shafts of said chuck-disks, intermediate lever Q', connecting-links $Q^2 Q^2$ and transverse slide $Q^3$ operated by said cam $n$ and engaging said intermediate lever Q', substantially as specified.

27. In a can-labeling machine, the combination with rotating and reciprocating chuck-disks F F', of operating-slide N, having a cam $n$, independently-reciprocating rack P carried by said slide N, levers Q Q connected to the shafts of said chuck-disks, intermediate lever Q', connecting-links $Q^2 Q^2$ and transverse slide $Q^3$, and a spring $Q^5$ for retracting said chuck-disks, substantially as specified.

28. In a can-labeling machine, the combination with rotating and reciprocating chuck-disks F F', of operating-slide N, having a cam $n$, independently-reciprocating rack P carried by said slide N, levers Q Q connected to the shafts of said chuck-disks, intermediate lever Q', connecting-links $Q^2 Q^2$, transverse slide $Q^3$ operated by said cam $n$ and engaging said intermediate lever Q', and springs $f^{22} f^{22}$ inserted between said levers Q, Q, and their connection with the shafts of said chuck-disks, substantially as specified.

29. In a can-labeling machine, the combination with rotating and reciprocating chuck-disks F F', of operating-slide N, having a cam $n$, independently-reciprocating rack P carried by said slide N, levers Q Q connected to the shafts of said chuck-disks, intermediate lever Q', connecting-links $Q^2 Q^2$, transverse slide $Q^3$ operated by said cam $n$ and engaging said intermediate lever Q', and a gear on the shaft of one of said chuck-disks engaging said rack P, substantially as specified.

30. In a can-labeling machine, the combination with rotating and reciprocating chuck-disks F F', of operating-slide N, having a cam $n$, independently-reciprocating rack P carried by said slide N, levers Q Q connected to the shafts of said chuck-disks, intermediate lever Q', connecting-links $Q^2 Q^2$, transverse slide $Q^3$ operated by said cam $n$ and engaging said intermediate lever Q', and a gear on the shaft of one of said chuck-disks engaging said rack P, said rack P having a corner or projection engaging said transverse slide $Q^3$ to prevent movement of the rack P until after the transverse slide $Q^3$ has closed the chuck-disks, substantially as specified.

31. In a can-labeling machine, the combination with rotating and reciprocating chuck-disks F F', of operating-slide N, having a cam $n$, independently-reciprocating rack P carried by said slide N, levers Q Q connected to the shafts of said chuck-disks, intermediate lever Q', connecting-links $Q^2 Q^2$, transverse slide $Q^3$ operated by said cam $n$ and engaging said intermediate lever Q', a gear on the shaft of one of said chuck-disks engaging said rack P, said transverse slide $Q^3$ being provided with a pawl $q^2$ and spring $q^3$, substantially as specified.

32. In a can-labeling machine, the combination with rotating and reciprocating chuck-disks F F' of operating-slide N, having a cam $n$, independently-reciprocating rack P carried by said slide N, levers Q Q connected to the shafts of said chuck-disks, intermediate lever Q', connecting-links $Q^2 Q^2$, transverse slide $Q^3$ operated by said cam $n$ and engaging said intermediate lever Q', and a gear on the shaft of one of said chuck-disks engaging said rack P, said rack P having a corner or projection engaging said transverse slide $Q^3$ to prevent movement of the rack P until after the transverse slide $Q^3$ has closed the chuck-disks, said transverse slide $Q^3$ being provided with a pawl $q^2$ and spring $q^3$, and said rack P being provided with a pawl $p^3$ for engaging said pawl $q^2$ and tripping the same to release the chuck-disks and permit the same to separate to discharge the can before the rack P begins its backward movement, substantially as specified.

33. In a can-labeling machine, the combination with a can-track B of rotating and reciprocating chuck-disks F F', stops B' $B^2$, having rock-shafts $b^2 b^2$ provided with arms $b^3 b^3$ and connecting-link $b^4$, and a spring $b^5$ for automatically lifting the stops into position, sliding rack P having cam $p^5$, levers $b^6$ and $b^{11}$, locking-bolt $b^9$ carried by one of said levers and engaging the other and a cam $b^{15}$ for operating said locking-bolt, substantially as specified.

34. In a can-labeling machine, the combination with a can-track B of rotating and reciprocating chuck-disks F F', stops B' $B^2$, having rock-shafts $b^2 b^2$ provided with arms $b^3 b^3$ and connecting-link $b^4$, and a spring $b^5$ for automatically lifting the stops into position, sliding rack P having cam $p^5$, levers $b^6$ and $b^{11}$, locking-bolt $b^9$ carried by one of said levers and engaging the other and a cam $b^{15}$ for operating said locking-bolt, pawl $b^{16}$ having spring $b^{18}$, a pin $b^{17}$ on one of said stops engaged by said pawl $b^{16}$, said pawl projecting in the path of the cans so as to be tripped by their passage, substantially as specified.

35. In a can-labeling machine, the combination with a can-track B of rotating and reciprocating chuck-disks F F', stops B' $B^2$, having rock-shafts $b^2 b^2$ provided with arms $b^3$ $b^3$ and connecting-link $b^4$, and a spring $b^5$ for automatically lifting the stops into position, sliding rack P having cam $p^5$, levers $b^6$ and $b^{11}$, locking-bolt $b^9$ carried by one of said levers and engaging the other and a cam $b^{15}$ for operating said locking-bolt, pawl $b^{16}$ having spring $b^{18}$, a pin $b^{17}$ on one of said stops engaged by said pawl $b^{16}$, said pawl projecting in the path of the cans so as to be tripped by their passage, and said pawl having a nose or cam $b^{19}$ to cause said pin $b^{17}$ to operate the pawl, substantially as specified.

36. The combination with a can-track of a movable stop for arresting the can, a spring for lifting the stop and a pawl projecting into the path of the can and adapted to be tripped by the can for holding said stop open or down, said pawl being provided with a cam or nose to cause the stop to turn or set the pawl, substantially as specified.

FRED C. MORRISON.

Witnesses:
H. M. MUNDAY,
EDMUND ADCOCK.